United States Patent [19]

Barfield et al.

[11] Patent Number: 4,501,715

[45] Date of Patent: Feb. 26, 1985

[54] MOLD AND METHOD FOR FORMING GOLF BALLS

[76] Inventors: Gilbert Barfield, 745 Carroll St., Perry, Ga. 31069; Gary J. Hagopian, 32 Brookmont Dr., Wilbraham, Mass. 01095

[21] Appl. No.: 495,738

[22] Filed: May 18, 1983

[51] Int. Cl.³ ............................................. B29D 3/00
[52] U.S. Cl. .................................. 264/248; 264/276; 425/395; 425/408; 425/806
[58] Field of Search ....................... 264/248, 254, 276; 425/395, 408, 520, 806

[56] References Cited

U.S. PATENT DOCUMENTS 1,202,318 10/1916 Roberts .............................. 264/248
2,148,079 2/1939 Martin, Jr. ....................... 425/806 R Primary Examiner—James B. Lowe
Attorney, Agent, or Firm—Donald S. Holland

[57] ABSTRACT

Mold and method of compression molding shell half covers around a core to form golf balls. Opposed dies are pressed together such that some of the material trapped between the approaching dies is forced back into the mold to compensate for shrinkage and the remainder is forced outside of the die cavities where it can be drained off.

11 Claims, 8 Drawing Figures

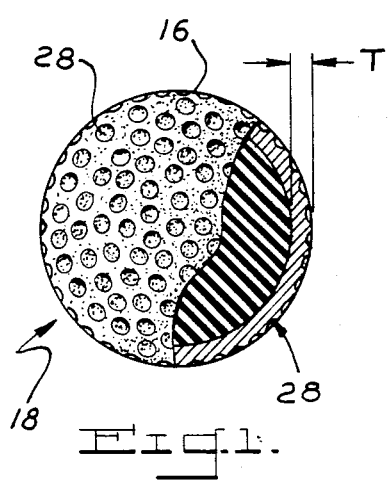
Fig.1.
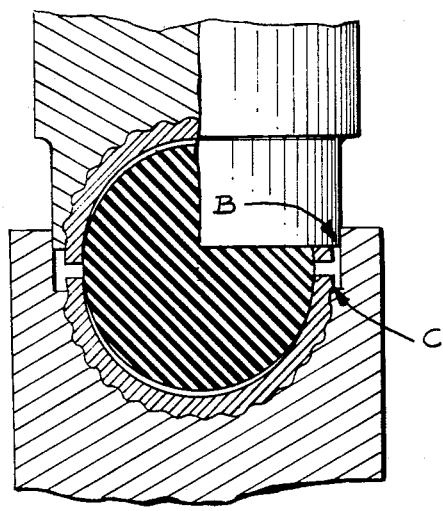
Prior Art
Fig.2.
Fig.3.
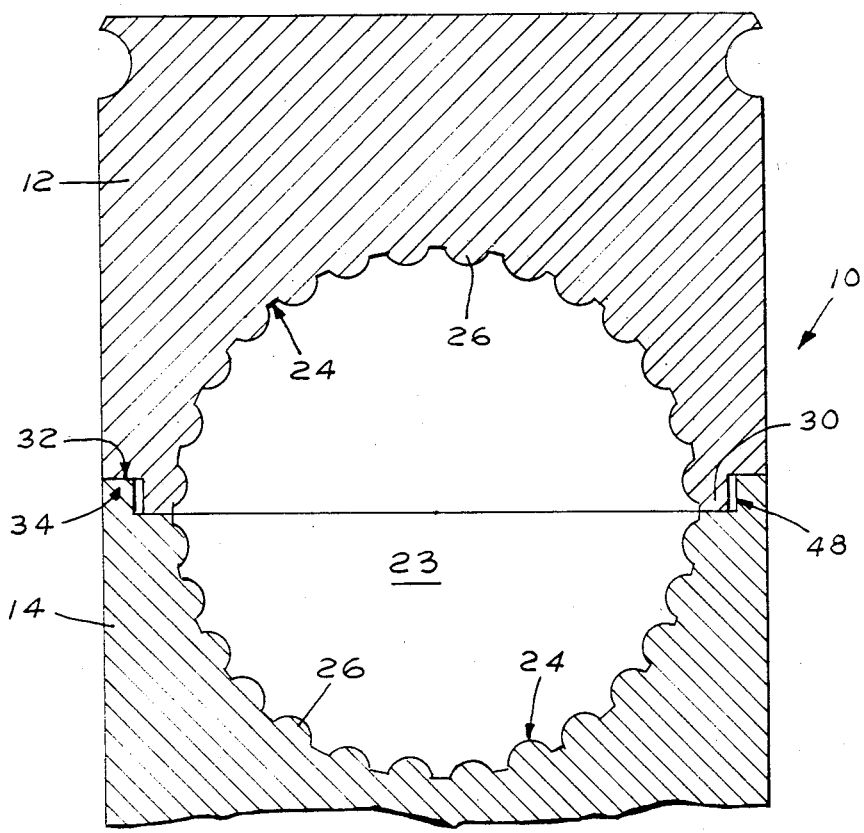

U.S. Patent  Feb. 26, 1985  Sheet 2 of 2  4,501,715
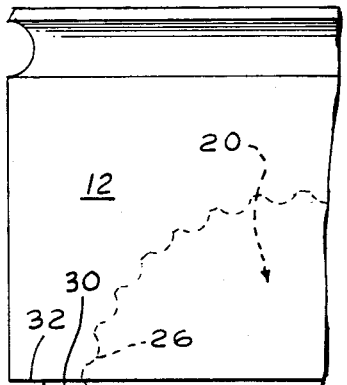
Fig.4.
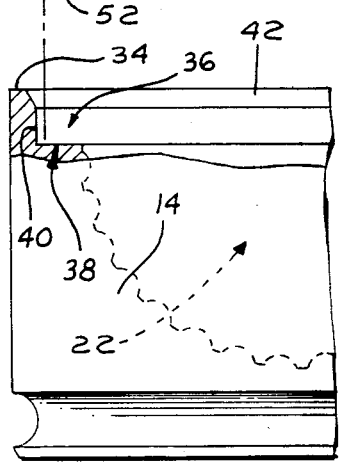
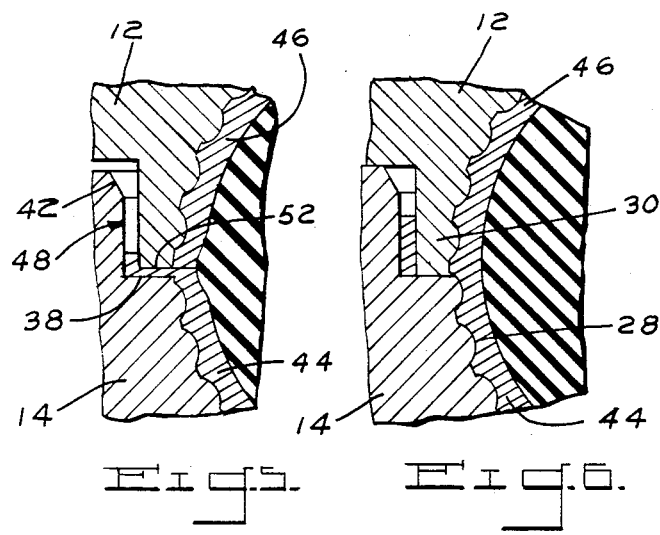
Fig.5.   Fig.6.
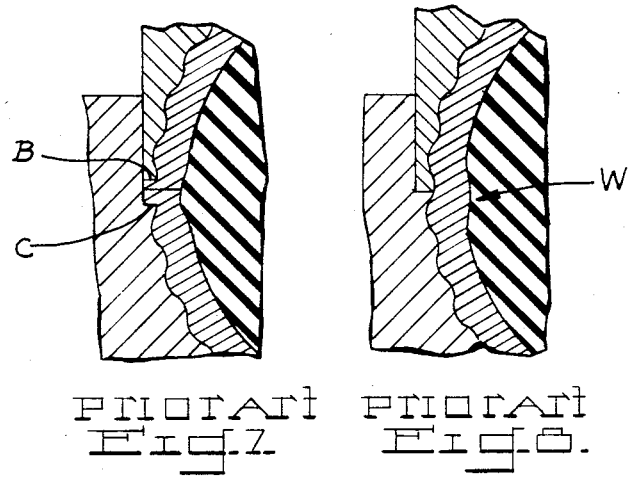
PRIOR ART
Fig.7.
PRIOR ART
Fig.8.

MOLD AND METHOD FOR FORMING GOLF BALLS

BACKGROUND OF THE INVENTION

This invention relates to the manufacture of two-piece golf balls.

The manufacture of two-piece golf balls, i.e., golf balls with only a solid core ball and a dimpled outer shell, has normally been done in an injection molding process. In this process, the solid core is first placed inside of a mold cavity, a set of pins then pushes upward through the bottom of the cavity to raise the core to a central position, and a molten material is then forced into the cavity and around the core to form the outer shell.

Although this process makes well-formed balls, it is a difficult one to control and requires skilled operators. Also, it requires expensive tooling and expensive maintenance to the tooling. Ideally, it would be preferred if a less expensive process could be found.

While manufacturers have had to use injection molding to form the dimpled shell on two-piece balls, they have been able to use a much less expensive process of compression molding for forming a similar shell on three-piece balls, i.e., the traditional golf ball with a small rubber core ball surrounded by elastic windings and then the outer shell. Obviously, the manufacturers would prefer to use compression molding in forming twopiece balls because the equipment and tooling are already available in their plants. Further, the general process of producing the outer shell would be less expensive because it would be easier to control and would therefore not require expensive, highly skilled operators.

Unfortunately, attempts to compression mold perfectly shaped, two-piece balls have failed because, unlike the wound centers of three-piece balls, the solid cores of two-piece balls are relatively incompressible. In three-piece balls the wound core has small voids between the latticework of elastic windings. During compression molding of the cover for a three-piece ball, the wound core is able to be compressed into a smaller volume because the elastic windings fill these voids. Since the windings seek to return to their original positions, this creates an internal "back pressure" within the molding cavity. This internal "back pressure" presses the cover stock for the shell firmly against the inside walls of the mold and results in the final product being an exact replica of the dimpled mold cavity. Conversely, since the solid core ball is relatively incompressible, it creates no appreciable internal "back pressure" during the compression molding of two-piece balls. On the contrary, the solid core material expands upon heating, and displaces cover stock from inside the mold. During the cooling cycle, the contents of the mold contract and pull away from the mold's sidewalls. Since there is no internal "back pressure", this pulling away causes distortion of the ball's surface and makes the product unacceptable.

In 1902, Eleazer Kempshall attempted to solve this problem by using telescopically mating dies to compression mold a dimpled cover for two-piece balls. As described in his U.S. Pat. No. 695,867, Kempshall's process of compression molding includes a pair of male and female dies. As shown in FIGS. 5–7 of the Kempshall patent, the female die has a rim or step C on which a small amount of the cover material extrudes when the dies are initially pushed together to form the cover. The overflow material is trapped between the approaching edges B and C of the two dies. Continued axial pressure on the dies causes the edges B and C to move toward one another and force the trapped material to flow back inside the mold cavity to create an integral dimpled cover for the ball.

While the Kempshall attempt was noteworthy, it has its drawbacks. As explained in the patent, the produced cover is not uniform because it has a welt at its equator. This welt prevents the ball from being consistently hit the same distance with any single golf club by an accomplished golfer. Since predictability in the length of a "shot" is important for a low score in golf, this lack of consistency and the welt which causes it are highly undesirable.

The inconsistency occurs when the "strike" of the golfer's club head hits against the welt. Because this portion of the cover is fatter than the rest, the strike creates less compression of the ball than it would if any other portion of the cover were struck. This lesser compression causes the ball to go a shorter distance than it would normally travel.

In addition to creating a welt, the compression molding process of Kempshall allows the size of the welt to vary from ball to ball. Since the volume of the solid core for two-piece balls can vary substantially from one core to the next, it is difficult to precisely control the amount of cover stock extruded from the mold cavity during mating of the dies. With the Kempshall mold, if a large core were encountered, an excessive amount of cover stock would be extruded and the same large amount would be forced back into the mold cavity with the result being an even larger deformation or welt at the center of the finished ball cover. Also, wear would occur on the approaching edges B and C of the dies because of the extra pressure placed on the edges by the increased bulk between them.

Accordingly, a need exists for an improved set of compression dies by which the deficiencies of the Kempshall dies can be overcome so that a consistently well-shaped dimpled cover for two-piece golf balls can be formed by compression molding.

It is therefore the primary object of the present invention to provide an improved set of dies by which well-formed dimpled covers can be compression molded for two-piece golf balls.

It is another primary object to provide a new mold for compression molding the cover onto two-piece golf balls wherein the mold has a unique valving system for preventing or minimizing the welt formed in golf balls manufactured by the Kempshall method.

It is a more specific object to provide an improved set of telescopic dies for compression molding two-piece golf balls in which the "Kempshall" welt is prevented by draining off excess extrusion during mating of the dies so that the amount of extruded material between them that is forced back into the mold cavity is only the amount precisely needed to produce a well-shaped dimpled cover.

It is yet another object to provide a set of improved dies that are economical in design, yet extremely durable and effective to use.

The above and other objects and advantages of this invention will become more readily apparent when the following description is read in conjunction with the accompanying drawings.

BRIEF DESCRIPTION OF THE DRAWINGS

FIG. 1 is a view, partly in cross section, of a two-piece golf ball that is formed by compression molding with the improved mold and process of the present invention;

FIG. 2 is an elevational view of the "prior art" mold disclosed in U.S. Pat. No. 695,867 to Kempshall;

FIG. 3 is a cross-sectional, elevational view of an improved mold made in accordance with the present invention, wherein the mold has telescopic halves or dies that are shown mated together;

FIG. 4 is an enlarged, fragmentary view of the FIG. 3 dies prior to their being closed together;

FIG. 5 is a fragmentary, cross-sectional view of the telescopic dies during the molding process for the FIG. 1 ball, with the dies being shown in their respective positions after they have started to mate but before they have reached their fully closed positions shown in FIG. 3;

FIG. 6 is a view similar to FIG. 5, but with the dies fully closed together; and, FIGS. 7 and 8 are views similar to FIGS. 5 and 6, showing the problems of ball-making as they occurred in the "prior art" mold disclosed in U.S. Pat. No. 695,867.

DETAILED DESCRIPTION OF THE PREFERRED EMBODIMENT

Referring to the drawings in detail, an improved mold for compression molding the outer shell or cover of two-piece golf balls is illustrated and generally designated by the reference numeral 10. The mold includes a pair of male and female dies or telescopic mold halves 12, 14 which are attached to a hydraulic press (not shown) for movement toward or away from one another. By operating the press, the dies can be mated or pushed together to compression mold the outer cover 16 onto the two-piece ball 18 shown in FIG. 1.

As best shown in FIGS. 3–6, the male and female dies 12, 14 have opposing, substantially hemispherical mold cavities 20, 22. When the dies mate and bottom out against one another (see FIG. 3), the hemispherical cavities form a single spherical mold cavity 23 with an inner surface 24 that is basically a mirror image of the cover 16. Each of the cavity halves 20, 22 has a plurality of rounded projections or mold surfaces 26 that are equidistantly spaced from one another and which form the well known dimples 28 on the cover.

As best shown in FIGS. 3 and 4, male die 12 has an annular projection or piston 30 that encircles the lip of mold cavity 22. Further, it has a stepped surface 32 outside the piston that acts as a bottoming shoulder when the dies 12, 14 are mated together in their fully closed positions shown in FIG. 3.

Female die 14 is basically a "negative image" of die 12. It includes a circular bottoming shoulder 34 and an adjacent recessed step 36 with a rim 38 located at the start of mold cavity 22. The step includes a vertical sidewall 40 with a canted or sloped lip 42 (here, angled approximately 15°) for guiding the piston 30 of the male die into the recessed portion 36 when the dies are initially pushed together into their telescopic positions shown in FIG. 5.

Like the Kempshall process described in U.S. Pat. No. 695,867, the disclosure of which is incorporated herein by reference, an integral cover 16 for a two-piece golf ball is formed by first placing a hemispherical shell or cover stock half 44 (made of any suitable thermoplastic material, such as SURLYN ®) inside of the female mold cavity 22 with the open side of half 44 facing upward. A standard rubber core ball is then placed inside of the cover stock half and another cover stock half 46 is placed over the top of the ball with its open side facing downward, opposite the open side of half 44. Next, heat is applied to the mold 10 to soften the cover stock. Then, the press is manipulated so that the dies 12, 14 are moved toward one another and forced to mate, with the annular piston 30 entering the recessed area 36.

Like Kempshall, when the piston 30 of the present invention enters the recessed area 36 on the opposite mold half, it traps a small amount of overflow cover stock or shell material in the recess 36. If an axial load is continued to be applied, material in the recessed area will be pressurized and will flow back into the mold cavities 20, 22, when the contents of the cavities cool and start to shrink. This back pressure results in the outer surface of the compression-molded two-piece ball being spherical and substantially a mirror image of the inner surface 24 of the mold cavities.

Unlike balls made with the Kempshall mold, a two-piece golf ball made with this invention does not include the large deleterious welt described in this application's BACKGROUND OF THE INVENTION and designated by the reference letter W in this application's FIG. 8.

The present invention includes a unique valving system 48 for preventing or minimizing the Kempshall welt by "draining off" excess extrusion during mating of the dies 12, 14. This draining provides that the amount of "remaining" extruded material that is forced back into the mold cavities 20, 22 is only the amount precisely needed to seal the cover stock halves 44, 46 into an integral cover 16 with a uniform thickness T.

If one considers that the idea is to restrict the overflow of cover stock material and/or push material back into the mold 10 to build back pressure and adequately form the golf ball, it seems logical that ideally one would be able to control that pressure. If a valve were attached to the piston 30 or recess 36, one would be able to bleed off excess back pressure and allow the mold halves to close while maintaining the "remaining" pressure at a certain level. By keeping the valve partially open at a predetermined correct setting, one could allow the back pressure to build to the optimum point and then bleed off as any excess occurs. This would maintain enough back pressure in the mold cavities 20, 22 to form the outer shell 16 well but not allow the pressure to build and "cold flow" material into the surface of the ball leaving a permanent set deformation.

While a valve in the conventional sense of the word cannot be attached to the mold 10, a unique valve can be used, such as that shown at 48. In the preferred embodiment, the valve 48 comprises an annular gap between the outside diameter of the piston 30 and the vertical sidewall 40 of recess 36. This gap allows bleed off of excess extruded material and excess pressure and maintains the back pressure at a proper level.

To achieve the proper valve setting, applicants have found that the inner diameter of the sidewall 40 should be 0.002 to 0.003 inches greater than the outer diameter of the piston 30. Since these dimensions are small, the size of the gap has been exaggerated in the drawings to ease in the understanding of the invention.

When the piston 30 enters the recessed area 36 and its leading edge 52 reaches the position shown in FIG. 5, extruded cover material is trapped between the edge 52 and the underlying portion of rim 38 in a pressure chamber, like the prior art mold of Kempshall shown in FIG. 7. However, unlike the trapped material in the Kempshall mold, excess extrusion in the present invention flows into the annular gap. As the dies 12, 14 are closed further together by the hydraulic press and the leading edge 52 moves farther into the recess 36, the trapped material between the edge 52 and rim 38 is forced in two directions. Most is normally pushed into the mold cavities 20, 22 to create the back pressure necessary to compensate for shrinking that is occurring. However, excess material is pushed into the gap.

Thus, as shown in FIG. 6, when the die halves are fully closed together and their surfaces 32, 34 bottom out against one another, the level of bled off material in the gap is slightly raised from its FIG. 5 position. Though bled off in this invention, the excess material would not have been removed in Kempshall and would have been forced back into the Kempshall mold cavity during the Kempshall process shown in this application's prior art FIGS. 7 & 8.

By controlling the width of the gap to 0.002–0.003 inches, it has been found that the gap is large enough to permit excess extrusion to flow or be pushed aside but small enough to maintain enough pressure to form a well-shaped golf ball with a substantially uniform thickness T and uniform dimples 28.

While a single embodiment of the invention has been disclosed, it should be understood by those skilled in the art that obvious structural modifications can be made without departing from the spirit or scope of the invention. For example, while the valving system 48 has been disclosed as a gap, it can alternatively be a series of one or more notches or overflow channels that extend transversely through the vertical sidewall 40. The notches are located above rim 36, near or contiguous with the bottoming shoulder 34 so that drainage will occur when the level of trapped material exceeds a predetermined height.

Accordingly, reference should be made primarily to the appended claims, rather than to the specification, for determining the scope of the invention.

Having thus described the invention, what is claimed is:

1. A process for compression molding an integral cover for two-piece golf balls, said process comprising:
   (a) attaching a pair of telescopically mating male and female dies to a hydraulic press for movement of the dies toward or away from one another in a substantially vertical plane, said male die having a substantially hemispherical mold cavity and an annular projection at the lip of said cavity, said female die having an oppositely facing, annular recess adapted to receive the projection and a substantially hemispherical mold cavity adapted to form a single, spherical mold cavity with said male die cavity when the dies are pushed together;
   (b) inserting a substantially hemispherical shell segment of thermoplastic cover material inside one of said cavities with the open end of said shell segment facing upward;
   (c) placing a solid core ball inside said shell segment;
   (d) placing another substantially hemispherical shell segment of thermoplastic cover material over said core ball with its open end facing the open end of the other shell segment;
   (e) operating the press to cause the dies to move toward one another and mate, with the annular projection of said male die entering the recess;
   (f) heating the dies to soften the cover material;
   (g) trapping extruded cover material from the cavities between the leading edge of the projection and an annular rim in the recess when the projection initially enters the recess;
   (h) continuing axial pressure on the dies to fully close the dies together and cause the leading edge of the projection to move closer to the rim and force trapped material to flow back inside the mold cavities to create an integral, spherical cover that is substantially a mirror image of the inside of the mold cavities; and,
   (i) draining off excess of the trapped material through a valve during mating of the dies so that the amount of extruded material that is forced back into the mold cavities is substantially only the amount needed to produce a well-shaped cover with a substantially uniform thickness.

2. The process of claim 1 wherein the excess trapped material between the dies is drained off in an annular gap between the piston and an annular sidewall of the recess.

3. The process of claim 2 wherein the gap is in the range of substantially 0.002–0.003 inches.

4. The process of claim 2 wherein the recess has a sloped lip for aligning the projection in the recess as the projection and recess initially mate.

5. A process of compression molding an integral cover for a two-piece golf ball, said process comprising:
   (a) placing a pair of oppositely facing, substantially hemispherical segments of cover stock material over a solid core ball;
   (b) heating the segments to soften them;
   (c) moving a pair of telescopically mating male and female dies toward one another to squeeze the segments together and seal them, said dies having a pair of oppositely facing, hemispherical mold cavities, said male die having a cylindrical projection adjacent its cavity and said female die having a substantially oomplementary-shaped recess adjacent its cavity;
   (d) trapping extruded cover material from the cavities in a pressure chamber formed by the projection and the recess when the dies are initially pushed together and the projection enters the recess:
   (e) moving the dies closer together to force the projection to move deeper into the recess and push trapped material back into the mold cavities to compensate for shrinkage of the contents in the cavities during a cooling cycle and to produce an integral, spherical cover that is substantially a mirror image of the mold cavities; and,
   (f) bleeding off excess trapped material via a valve to insure that the amount of trapped material which is forced back into the mold cavities is substantially only the amount needed to form a well-shaped spherical cover of uniform thickness.

6. The process of claim 5 further including the step of keeping the valve open to permit the back pressure created within the mold cavities to rise to the optimum level to form a well-shaped ball but then bleed off if any excess pressure occurs.

7. A process of compression molding an integral cover for a two-piece golf ball, said process comprising:

(a) placing a pair of oppositely facing, substantially hemispherical segments of cover stock material over a solid core ball;

(b) heating the segments to soften them;

(c) moving a pair of telescopically mating dies toward one another to squeeze the segments together and seal them;

(d) trapping extruded cover material from the cavities in a pressure chamber formed by mating portions of the dies when the dies are initially pushed together but not fully closed together;

(e) moving the dies and mating portions closer together to force trapped material back into the mold cavities to create an integral, spherical cover that is substantially a mirror image of the mold cavities; and, (f) draining off excess of the trapped material, as the dies are being pushed closer and closer together, so that the amount of trapped material forced back into the cavities is substantially only the amount needed to create an integral cover having a uniform thickness.

8. A mold for compression molding an integral cover for two-piece golf balls, said mold comprising:

(a) a pair of telescopically mating male and female dies which are adapted to be attached to a hydraulic press for movement of the dies toward and away from another;

(b) said male die having a substantially hemispherical mold cavity and an annular piston at the lip of said cavity;

(c) said female die having a recessed area and an adjacent, substantially semispherical mold cavity, wherein the recess is adapted in size and shape to receive the piston when the dies move toward one another and said female mold cavity is adapted in size and shape to form a single, spherical mold cavity with said male cavity when the dies mate, and said female mold cavity is further adapted in size and shape to receive a hemispherical shell of cover stock material and a standard core ball for two-piece golf balls;

(d) wherein said dies include means for trapping extruded cover material from the cavities when the dies are pushed together and for subsequently forcing the trapped material back into the mold cavities to form an integral, spherical cover that is substantially a mirror image of the cavities, said trapping and forcing means comprising a pressure chamber formed by a leading edge of the piston and an annular rim at the bottom of the recess; and, (e) valve means connected with said pressure chamber for draining off excess of the trapped material to insure that the only amount of trapped material transferred back into the cavities is the amount needed to produce a well-formed cover of uniform thickness.

9. The mold of claim 8 wherein the valve means comprises an annular sidewall inside said recess that is 0.002–0.003 inches greater than the outer diameter of said piston.

10. The mold of claim 9 wherein the annular sidewall has a sloped lip for receiving and aligning the piston in the recess when the dies are initially pushed together.

11. A mold for compression molding an integral cover for two-piece golf balls, said mold comprising:

(a) a pair of telescopically mating male and female dies which are adapted to be attached to a hydraulic press for movement of the dies toward and away from another (b) said male die having a substantially hemispherical mold cavity and an annular piston at the lip of said cavity, said cavity having a plurality of equidistantly spaced, rounded projections and said piston having the shape of a right cylinder;

(c) said female die having a recessed area and an adjacent, substantially semispherical mold cavity;

(d) wherein the recessed area is comprised of an annular sidewall and an annular rim and the sidewall is adapted in size and shape to receive the piston when the dies move toward one another;

(e) wherein said female mold cavity has a plurality of equidistantly spaced, rounded projections and is adapted in size and shape to form a single, spherical mold cavity with said male die cavity when the dies mate;

(f) wherein said die cavities are further adapted in size and shape to receive a standard solid core for two-piece golf balls and hemispherical shell segments of cover stock material around the core;

(g) wherein said dies include means for trapping extruded cover material from the cavities when the dies are pushed together and for subsequently forcing the trapped material back into the mold cavities to form an integral, dimpled cover that is substantially a mirror image of the cavities, said trapping and forcing means comprising a pressure chamber formed by a leading edge of the piston and the annular rim when the dies mate; and, (h) said dies further include valve means connected with said recess for draining off excess of the trapped material so that the only amount of trapped material forced back into the cavities is the amount needed to produce an integral cover of uniform thickness, wherein said valve means comprises the annular sidewall having a diameter 0.002–0.003 inches greater than the outer diameter of said piston.

* * * * *